No. 863,071. PATENTED AUG. 13, 1907.
J. E. KIRSTEIN.
MEASURING STOCK FEEDING TROUGH.
APPLICATION FILED DEC. 3, 1906.
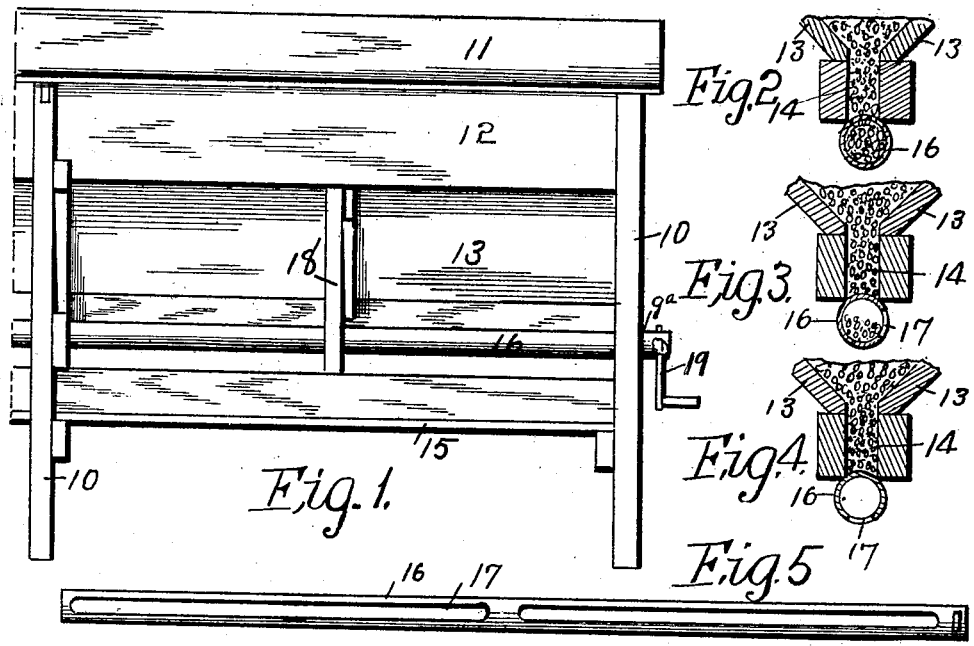
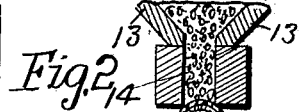
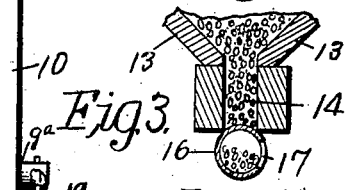
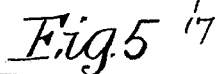
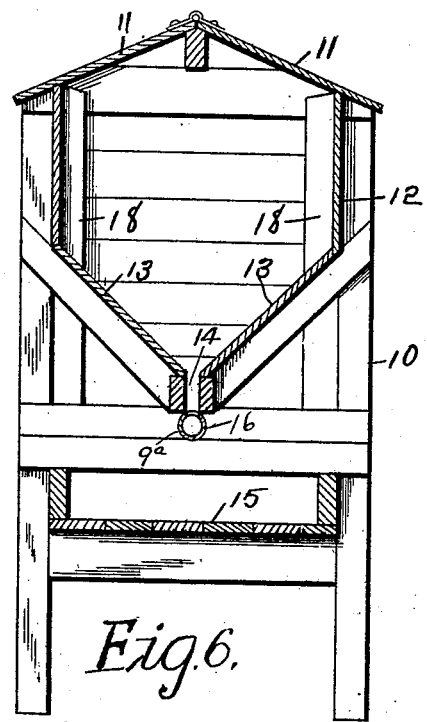
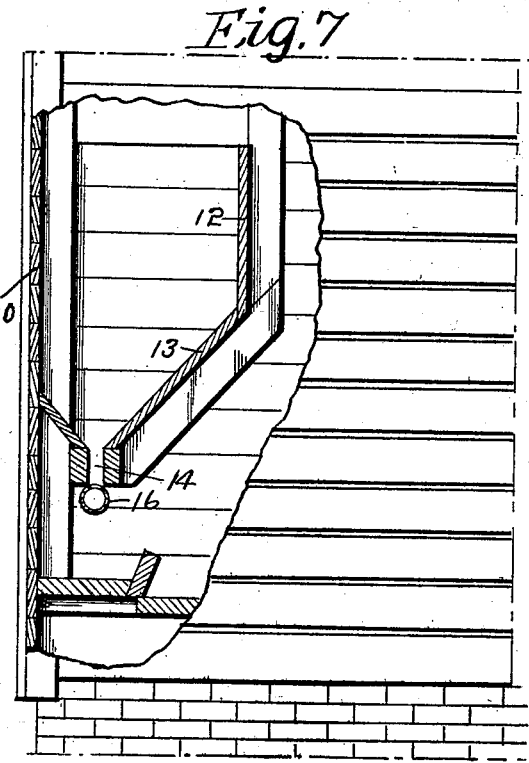
Witnesses
A. G. Hague
P. C. Dahlberg.
Inventor
John E. Kirstein
by Orwig & Lane att'ys

UNITED STATES PATENT OFFICE.

JOHN E. KIRSTEIN, OF CLARION, IOWA.

MEASURING STOCK-FEEDING TROUGH.

No. 863,071.  Specification of Letters Patent.  Patented Aug. 13, 1907.

Application filed December 3, 1906. Serial No. 346,091.

*To all whom it may concern:*

Be it known that I, JOHN E. KIRSTEIN, a citizen of the United States, residing at Clarion, in the county of Wright and State of Iowa, have invented a certain new and useful Measuring Stock-Feeding Trough, of which the following is a specification.

The object of my invention is to provide a device of simple, durable and inexpensive construction for delivering grain in measured quantities from a hopper to a stock feeding trough.

More specifically, it is my object to provide a measuring and delivering device normally closing the discharge opening of a grain hopper and so arranged that it may be manipulated by the operator to deliver a measured quantity of grain to the feeding trough and spread the same in a uniform manner throughout the entire length of the trough so that it will be accessible to animals standing at any place throughout the length of the trough and on each successive operation of the delivering device a corresponding amount of measured grain will be so delivered to the trough, said delivering device being so arranged that the operator may stand at the end of the trough when operating it and need not enter between the animals standing at the sides of the trough.

My invention consists in certain details in the construction, arrangement and combination of the various parts of the device, whereby the objects contemplated are attained, as hereinafter more fully set forth, pointed out in my claim and illustrated in the accompanying drawings, in which—

Figure 1 shows a side elevation of a stock feeding hopper and trough having my improvements applied thereto. Fig. 2 is an enlarged detail section showing the measuring device in position to receive grain. Fig. 3 is a similar view showing said device as partly filled with feed and as closing the delivery chute of the hopper. Fig. 4 is a similar view showing the measuring device in position to close the delivery chute of the hopper and to discharge. Fig. 5 shows a plan view of the measuring and delivering receptacle. Fig. 6 shows a transverse, sectional view through the complete hopper, trough and delivering receptacle taken on a line near the center of Fig. 1, and Fig. 7 shows a similar view of the modified form of invention showing the hopper and trough contained within a building, the wall of said building forming part of the hopper and trough.

Referring to the accompanying drawings, I have used the reference numeral 10 to indicate the frame of the feeding trough and hopper. At the top of the frame are the hinged covers 11 and below them is a hopper 12 having its bottom pieces 13 inclined downwardly and inwardly toward the longitudinal center of the hopper, said parts 13 being spaced apart at their lower ends to form a grain passageway 14 between them. Some distance below the grain passageway 14 is the feeding trough 15 supported by the frame.

The measuring and delivering device comprises a cylindrical body portion 16 mounted for rotation in bearings 9ª in the frame 10 and standing directly beneath the grain passageway 14, its upper surface preferably being in engagement with the lower end of the material forming said passageway. This body portion is provided on one side with one or more elongated openings 17. If the feeding trough is very long bearings may be provided between the ends of the body portion 16 at the points between the openings 17. In Fig. 1 a bearing of this kind is shown and indicated by the numeral 18. At the end of the body portion 16 that projects beyond the hopper, I have provided a crank 19 fixed to the body portion.

In the modified form shown in Fig. 7, I have illustrated my invention as applied to a hopper and trough contained within a building and I have shown the wall 20 of the building as forming one side of the hopper and one side of the trough. In this way an economy is effected in the construction of the trough when it is desired to use the inside of a building. In other respects, this modified form is similar in essential features to the preferred form shown and described.

In practical use and assuming the hopper to be filled with grain and assuming further that the grain measuring and delivering device is in the position shown in Fig. 2 with the openings therein communicating with the passageway 14. Obviously in this position the body portion 16 will be filled with grain or other material contained within the hopper. The operator standing at the end of the gate trough may by turning the crank 19 one-quarter of a revolution move the measuring and delivering device to the position shown in Fig. 3 with the openings 17 at the side thereof, so that some of the contents of the body portion 16 will flow through said openings. Then when the operator turns the crank a quarter revolution further the openings 17 will be at the bottom of the body portion 16 and all of the contents thereof will be discharged into the trough. By placing this body portion 16 at the bottom of the passageway 14, none of the contents of the hopper may pass around the sides of the body portion 16 and, therefore, all of the material delivered from the hopper to the trough will be that contained within the body portion and discharged therefrom so that an accurately measured quantity of material will be delivered each time that the delivering and measuring device is turned a complete revolution. Therefore, assuming that the measuring and delivering device has a capacity of one bushel and it is desired at a certain time to place in the trough three bushels of grain, the operator simply turns the crank 19 three complete revolutions, thus causing the measuring and delivering device to be filled and discharged three times. Obviously any other number of measured quantities of grain may be delivered in the same manner.

Having thus described my invention, what I claim and desire to secure by Letters Patent of the United States, therefor is—

A measuring stock feeding trough comprising a frame, a hopper arranged in the frame and having its bottom pieces inclined downward and inward and spaced apart to form a passageway for grain between them, a feeding trough located in the frame and below said passageway, and a measuring and delivering device having a cylindrical body portion mounted to rotate about its axis in the frame and provided at one side with an elongated opening 17 and also provided at one end and outside the frame with means, whereby it may be turned about its axis; the said cylindrical body portion of the measuring and delivering device extending partly upward in the passageway of the hopper, whereby it snugly bears at all times against opposite sides of the lower end of said passageway.

JOHN E. KIRSTEIN.

Witnesses:
M. G. MATHER,
A. O. DEWEY.